United States Patent [19]

Strobl

[11] Patent Number: 5,494,356
[45] Date of Patent: Feb. 27, 1996

[54] BEARING RETAINER FOR A MINIATURE MOTOR

[75] Inventor: Georg Strobl, Stuttgart, Germany

[73] Assignee: Johnson Electric S.A., Switzerland

[21] Appl. No.: 255,656

[22] Filed: Jun. 8, 1994

[30] Foreign Application Priority Data

Jun. 8, 1993 [GB] United Kingdom ............ 9311823

[51] Int. Cl.$^6$ .............. F16C 23/04; H02K 5/16
[52] U.S. Cl. .......... 384/204; 29/898.043; 29/898.049; 310/90
[58] Field of Search .............. 384/204, 206–214, 384/202, 203, 295, 428, 439; 310/90; 29/898.043, 898.045, 898.048, 898.049

[56] References Cited

U.S. PATENT DOCUMENTS

| 791,086 | 5/1905 | Deutsch | 384/209 |
| 2,070,718 | 2/1937 | Ehrlich | 310/90 X |
| 2,462,204 | 2/1949 | Ludwig | 310/90 X |
| 3,717,779 | 2/1973 | Hallerback | 310/90 |
| 4,350,912 | 9/1982 | Burton | 384/202 X |
| 4,471,246 | 9/1984 | Paillet | 310/90 |
| 4,795,926 | 1/1989 | Someya et al. | 310/90 |
| 4,910,424 | 3/1990 | Borcherding | 384/214 X |

FOREIGN PATENT DOCUMENTS

| 510984 | 4/1992 | European Pat. Off. . |
| 545692 | 6/1993 | European Pat. Off. . |
| 2054015 | 4/1971 | France . |
| 372825 | 2/1931 | United Kingdom . |
| 1216146 | 12/1970 | United Kingdom . |
| 1423032 | 1/1976 | United Kingdom . |
| 2152294 | 7/1985 | United Kingdom . |
| 2207291 | 1/1989 | United Kingdom . |

Primary Examiner—Thomas R. Hannon
Attorney, Agent, or Firm—Ostrolenk, Faber, Gerb & Soffen

[57] ABSTRACT

A bearing retainer 20 has a hollow body 21 with an open end forming a mouth 25. The mouth opens into an inner void 23 having a bearing support surface 28 for receiving a bearing. The void also has a plurality of axially extending ribs 30 defining a number of lubrication reservoirs or recesses 33. A plurality of teeth 26 extend axially from the open end for engaging a hole in the motor casing to prevent rotation between the retainer and the casing and are deformable to prevent axial separation. Proud co-planar abutment surfaces 27 are respectively disposed between adjacent teeth and bear against the casing to axially align the casing and retainer. The bearing is made by forging, casting or sintering.

23 Claims, 4 Drawing Sheets 5,494,356

BEARING RETAINER FOR A MINIATURE MOTOR

FIELD OF THE INVENTION

This invention relates to a bearing retainer for a miniature motor and to a method of fitting a bearing to a motor casing using the bearing retainer. In particular, the invention relates to a bearing retainer made by forging, casting, sintering or similar moulding techniques.

BACKGROUND ART

The rotor of a fractional horsepower or miniature motor is normally mounted for rotation in bearings supported by an integral end wall of a drawn metal can forming the motor casing and by an end cover or cap closing the casing. The end wall has a hole through which the motor shaft extends. The wall may be deformed to form a recess or housing for the shaft bearing as shown, for example, in GB 2207291. This process is complicated and thus costly to perform with a high degree of accuracy.

As an alternative, the bearing may be retained in a bearing retainer which is fitted to the hole in the end wall of the motor casing. The retainer may be a plastic part as shown, for example, in GB 1216146. Here, a plastic ring is used to grip the bearing and retain it with respect to the casing. However, as indicated, the plastic material which makes that method economically viable is not suitable for sleeve or self-aligning sleeve bearings with the motor casing providing the lateral support directly to the bearing.

Machined bearing retainers, usually turned parts, formed from aluminium have proved very satisfactory in retaining the bearing axially but there is a problem with the retainer rotating with respect to the casing as the retainer by necessity is round and fitted to a round hole. Also, the cost of providing machined parts is becoming a significant cost component in a miniature motor.

Hence, there is a need for an alternative to plastic and machined bearing retainers for the end wall of motor casings for miniature motors.

DISCLOSURE OF THE INVENTION

The present invention provides a bearing retainer made by a moulding process such as forging, casting or sintering, which means that the retainer can be produced from steel or other metals giving good dimensional stability and strength and can be formed to mate with non-circular holes in the motor casing, thereby positively preventing rotation of the bearing retainer with respect to the casing. Another advantage of the forging process is that there is no material wastage.

Accordingly, one aspect of the present invention provides a method of fitting a bearing to a motor casing comprising the steps of, forming a bearing retainer with a plurality of axially extending projections, drawing a motor casing in the form of a can-like structure with a closed end and an open end from a blank, forming a hole in the closed end for accommodating the bearing retainer, fitting a bearing retainer to the hole in the closed end, deforming the projections to secure the retainer to the casing and fitting a bearing to the retainer.

Preferably, the bearing retainer is formed with lubrication reservoirs. Lubrication reservoirs filled with lubricant impregnated material, e.g., oiled felt, can significantly extend the life of a sleeve bearing such as a porous sintered bronze bushing.

Preferably, the retainer is formed with a bearing support surface including a part-spherical surface for mating with a self-aligning bushing.

Preferably, the hole forming step includes forming a hole of complementary shape to the teeth to form a formlock connection between the retainer and the housing to prevent relative radial and/or rotational movement between the retainer and the casing.

Preferably, the forming of the retainer includes forming a plurality of abutment surfaces in a common plane between respective projections, and the fitting step includes abutting the abutment surfaces against the casing while deforming the projections to axially locate the retainer with respect to the casing.

According to a second aspect, the present invention provides a bearing retainer for fitting a bearing to a casing of a miniature motor, comprising a hollow body having a central axis, a first axial end forming a mouth in the body and an inner void having a bearing support surface for receiving the bearing; alignment means for axially aligning the bearing with the casing, and a plurality of plastically deformable teeth extending axially from the first end, arranged to co-operate with at least one hole in the casing to prevent radial and rotational movement between the retainer and the casing and deformable to prevent axial separation of the retainer from the casing. The provisions of a plurality of teeth which extend into the motor casing allow the hole in the motor casing to be formed with a shape which co-operates with the teeth to positively prevent radial and rotational movement between the retainer and the casing.

Preferably, the void has a plurality of ribs defining a plurality of recesses. The radially inner surface of ribs forming at least a part of the bearing support surface. These recesses may form lubrication reservoirs or simply reduce the weight of and the volume of material needed to form the retainer.

Preferably, the bearing support surface includes a part-spherical surface portion for receiving a complementary surface of a self-aligning sleeve bearing.

Preferably, the alignment means comprises a plurality of abutment surfaces formed on the first end and respectively disposed between adjacent teeth.

Preferably, a depression is formed around the root of each tooth or each abutment surface is bound on opposite sides by depressions. The depressions allow for the non-right angle corner formed between the teeth and the abutment surfaces by the forging process. Also, small burrs which may be formed on the edges of the hole in the casing can be accommodated within the depressions to ensure that the small burrs and/or the rounded corners do not cause axial misalignment between the retainer and the casing.

Although the retainer could be formed from aluminium as are the turned retainers or from brass, bronze, etc., a steel retainer, especially one of low carbon steel, may have added advantages. A steel retainer may form part of the return flux path which may be an advantage if a large retainer is used and/or the flux density from the end wall is at or approaching saturation. A steel retainer could form a stronger bond with a steel motor casing by resisting joint failure due to electrolysis erosion and thermal expansion creeping.

Preferred embodiments of the invention will now be described by way of example only with reference to the accompanying drawings.

DETAILED DESCRIPTION OF THE PREFERRED EMBODIMENTS

Figure 1:
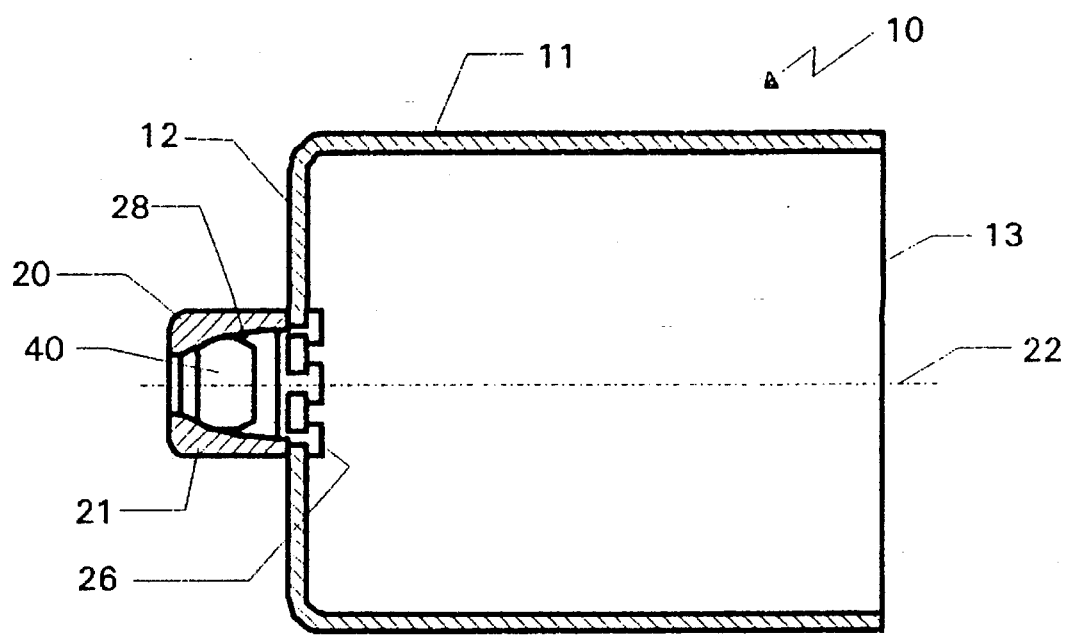
FIG. 1 is a sectional side elevation view of a motor casing for a miniature electric motor with a bearing retainer incorporating a bearing.

A motor casing 10 for a miniature motor is shown in section in FIG. 1 fitted with a bearing retainer according to the first embodiment. The casing is a drawn steel can having a tubular side wall 11 with a closed end wall 12 and an open end 13. While the bearing retainer may be formed to accommodate a sleeve bearing, a ball or roller bearing, the preferred embodiments illustrate the bearing retainer being formed with a bearing support surface for a self-aligning sleeve bearing. A self-aligning sleeve bearing or bushing 40 is shown fitted to the retainer 20 and is held in place by a spring (not shown) in the usual manner. A self-aligning bearing is able to swivel slightly within the retainer to accommodate slight misalignment between the retainer/bearing and the shaft. The bearing, however, should not be allowed to freely rotate with respect to the retainer as this would cause wear on the bearing support surface leading to retention and alignment problems.

Figure 2:
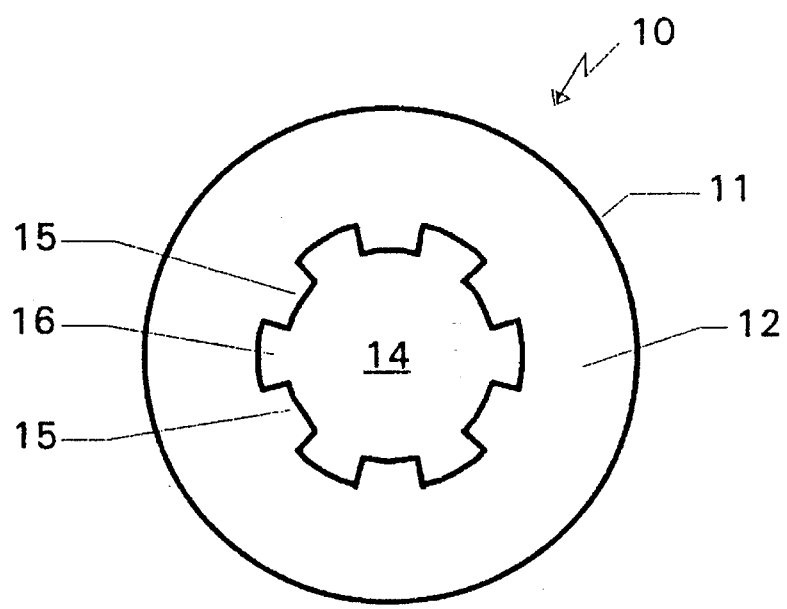
FIG. 2 is an outside end view of the casing of FIG. 1 shown without the retainer.

As shown in FIG. 2, the end wall 12 has a non-circular aperture 14 for connecting the bearing retainer. The aperture 14 has a castellated margin forming a series of radially inwardly directed projections 15 with intervening spaces 16. The radially outer edge of the spaces 16 and the radially inner edge of the projections 15 form sections of two concentric circles.

Figure 3:
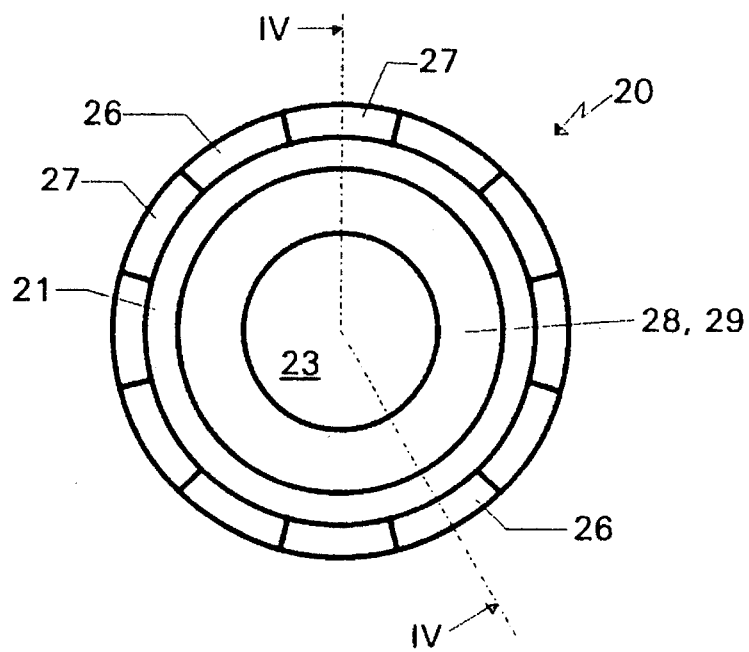
FIG. 3 is an end view of a bearing retainer according to a first embodiment before being fitted to the motor casing.
Figure 4:
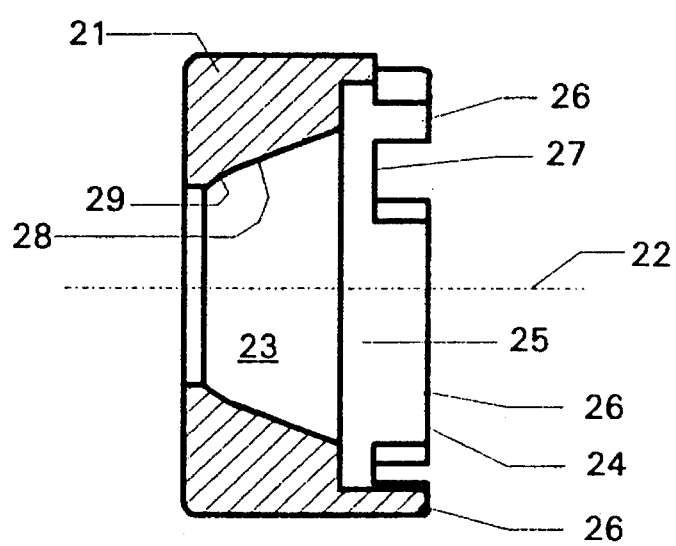
FIG. 4 is a sectional side view of the bearing retainer of FIG. 3 viewed along section lines IV—IV.

The bearing retainer 20 is more clearly shown in FIGS. 3 and 4 and is formed by forging. The retainer is formed with a body portion 21 having a central axis 22 and an inner void 23 for accommodating the bearing. The void opens one end 24 of the body which mates with the housing, to form a mouth 25 with an axially extending teeth 26, which extend into the motor casing through the spaces 16. The projections 15 bear against the mouth 25 of the retainer in between the teeth 26 to axially align the retainer 20 with respect to the casing 10. The portions of the mouth between the teeth 26 form alignment means in the form of abutment surfaces 27 confronting or co-operating with the projections 15.

Once in place, the teeth 26 are partially deformed, e.g. by swaging, to secure the retainer in position, thereby preventing axial separation of the retainer and casing. The teeth 26 and the projections 15 intermesh to prevent radial and/or rotational movement of the retainer with respect to the casing, i.e., the radially extending sides of the teeth 26 bear against or contact the radially extending edges of the projections 15.

If the inside diameter of the mouth 25, after the teeth have been swaged, is larger than the bearing to be fitted to the bearing retainer, the bearing may be fitted after the retainer has been secured to the casing. However, it is preferred that the bearing be fitted to the retainer before the retainer is secured to the housing as the open end 24 of the retainer 20 faces inwardly of the casing 10.

The void has a bearing support surface 28 against which the bearing mates which includes a part-spherical surface 29 to bear against a complementary part-spherical surface of the self-aligning bearing. This part-spherical surface gives the bearing its freedom.

Figure 5:
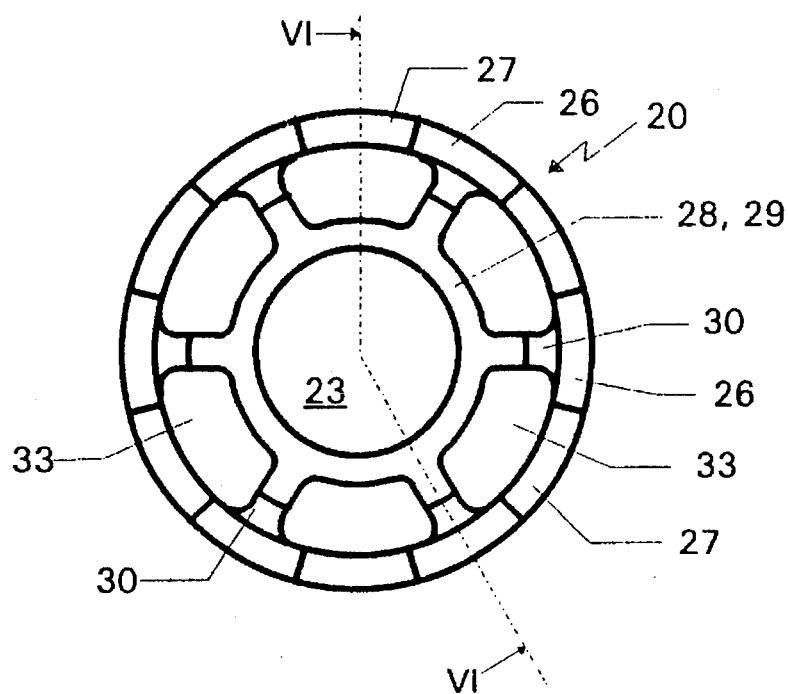
FIGS. 5 and 6 are views similar to FIGS. 3 and 4 of a bearing retainer according to a second embodiment.
Figure 6:
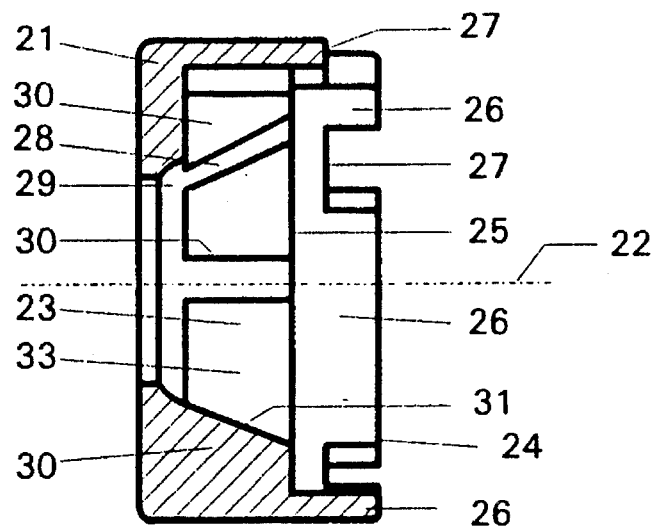

The bearing retainer of FIGS. 5 and 6 is similar with the exception that the void 23 has a number of inwardly extending ribs 30 with the radially inner surface 31 of the ribs forming part of the bearing support surface 28 including the part-spherical surface 29. The part-spherical bearing support surface 29 includes an annular ring formed on the end wall of the retainer with zones extending along the radially inner face of the ribs 30. The ribs also define a number of recesses 33 within the void. The recesses 33 may be used as lubrication reservoirs or left empty.

Figure 7:
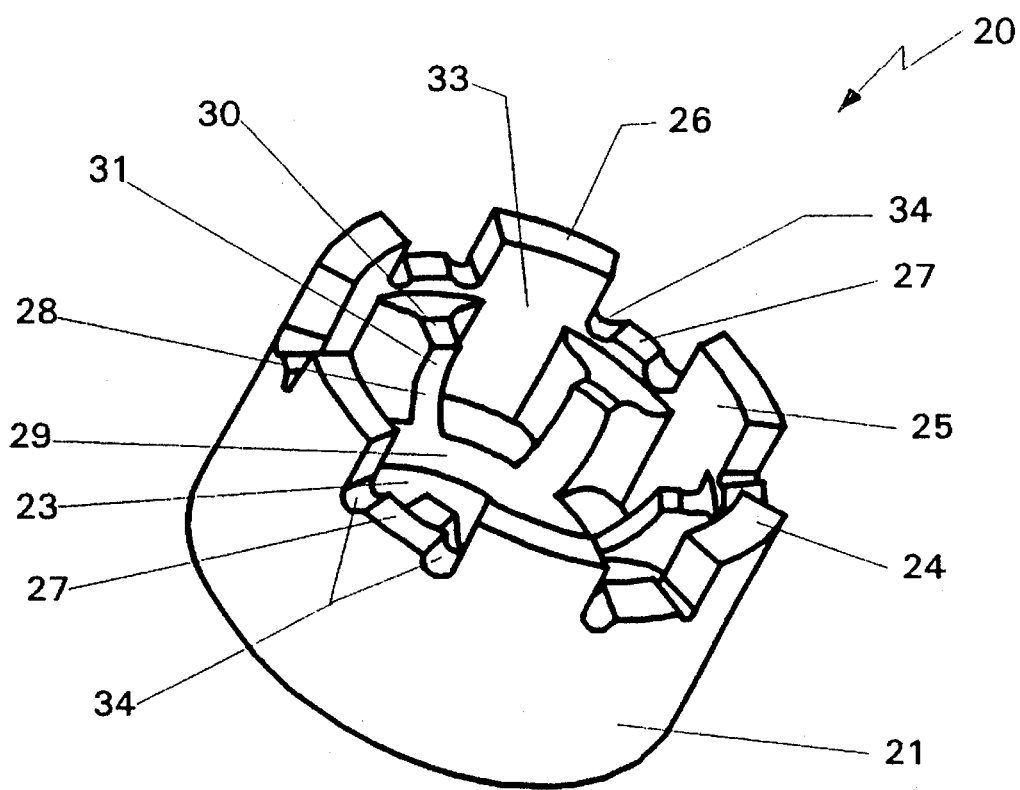
FIG. 7 is a perspective view of a bearing retainer according to a further embodiment.

In FIGS. 5 and 6, the ribs 33 are aligned with the teeth 26 whereas in FIG. 7, the ribs 33 are aligned with the abutment surfaces 27.

The preferred form for the abutment surfaces 27 is shown more clearly in FIG. 7. Each abutment surface has a raised or proud section lying in a common plane between adjacent teeth 26. The proud portion is bounded on opposite sides by depressions 34 formed at the root of the teeth 26.

While forging is the preferred method of forming the retainer, other moulding techniques such as casting and sintering may be used to form the retainer. These moulding techniques minimize wastage of material. Forging is preferred because of the speed of production. Cold forging is most preferred to avoid the cost of heating the blanks.

I claim:

1. A method of fitting a bearing to a motor casing comprising the steps of:

forming a bearing retainer;

drawing a motor casing into a can-like structure with a closed end and an open end;

forming a hole in the closed end of the casing;

fitting and securing the retainer to the hole; and fitting a bearing to the retainer, the step of forming the bearing retainer including molding the bearing retainer in the form of a hollow body with a central axis including a plurality of teeth extending axially from a first end, and molding a respective abutment surface between each pair of adjacent teeth;

the securing step includes deforming the teeth to axially, radially and rotationally secure the retainer to the casing.

2. A method as defined in claim 1 wherein the bearing is fitted to the retainer before the retainer is fitted to the motor casing.

3. A method as defined in claim 1 wherein the step of forming the bearing retainer includes forming lubrication reservoirs in the retainer.

4. A method as defined in claim 1 wherein the step of forming the bearing retainer includes forming a bearing surface including a part-spherical surface for mating with a self-aligning bushing.

5. A method as defined in claim 1 wherein the retainer is formed by forging a low carbon steel blank.

6. A method as defined in claim 1 wherein the retainer is formed by sintering.

7. A method according to claim 1 wherein the hole forming step includes forming a hole of complementary shape to the teeth to form a formlock connection between the retainer and the casing to prevent axial rotation of the retainer with respect to the casing; the step of forming the bearing retainer includes forming a plurality of raised abutment surfaces in a common plane between respective adjacent teeth and the fitting step includes abutting the abutment surfaces against the casing while deforming the teeth to axially locate the retainer with respect to the casing.

8. A method of fitting a bearing to a motor casing comprising the steps of:

drawing a motor casing into a can-like structure with a closed end and an open end;

forming a hole in the closed end of the motor casing;

forming a bearing retainer into a hollow body with an inner void arranged to receive the bearing, a mouth formed on a face of the hollow body opening the void, a plurality of teeth formed around the mouth and extending substantially perpendicular to the face of the body with depressions around the roots of the teeth forming abutment surfaces between adjacent teeth;

fitting and securing the retainer to the hole in the closed end of the motor casing with the teeth extending through the hole and with the abutment surfaces abutting the casing to axially align the retainer with the motor casing;

plastically deforming the teeth to axially, radially and rotationally secure the retainer to the casing; and fitting a bearing to the retainer.

9. A method according to claim 8, further including the step of forming the inner void with a bearing surface arranged to receive a self-aligning sleeve bearing.

10. A method according to claim 8, further including the step of forming at least three radially and axially extending ribs on the surface of the inner void to form a plurality of recesses within the inner void with the radially inner faces of the ribs being shaped to receive a self-aligning sleeve bearing.

11. A bearing retainer for fitting a bearing to a casing of a miniature motor, the retainer comprising:

a hollow body having a central axis, a first axial end forming a mouth in the body and an inner void having a bearing support surface for receiving the bearing; and alignment means for axially aligning the retainer with the casing;

characterised by a plurality of plastically deformable teeth extending axially from the first end, arranged to co-operate with at least one hole in the casing to prevent radial and rotational movement between the retainer and the casing and deformable to prevent axial separation of the retainer from the casing;

wherein the alignment means comprises a plurality of abutment surfaces formed on the first end and respectively disposed between adjacent teeth.

12. A retainer as defined in claim 11 wherein the void has a plurality of ribs defining a plurality of recesses, the radially inner surface of the ribs forming at least a part of the bearing support surface.

13. A retainer as defined in claim 11 wherein the bearing support surface includes a part-spherical surface portion for receiving a complementary surface of a self-aligning sleeve bearing.

14. A retainer as defined in claim 11 wherein the retainer is formed of a low carbon steel.

15. A retainer as defined in claim 11 wherein the retainer is a forged bearing retainer.

16. A retainer as defined in claim 11 wherein the retainer is a sintered bearing retainer.

17. A retainer as defined in claim 11 wherein the retainer is a cast bearing retainer.

18. A bearing retainer for fitting a bearing to a casing of a miniature motor, the retainer comprising:

a hollow body having a central axis, a first axial end forming a mouth in the body and an inner void having a bearing support surface for receiving the bearing; and alignment means for axially aligning the retainer with the casing;

characterized by a plurality of plastically deformable teeth extending axially from the first end, arranged to co-operate with at least one hole in the casing to prevent radial and rotational movement between the retainer and the casing and deformable to prevent axial separation of the retainer from the casing; and wherein a depression is formed around the root of each tooth.

19. A bearing retainer for fitting a bearing to a casing for a miniature motor, the retainer comprising:

a hollow body with a central axis, first and second axial ends, the first end forming a mouth and an inner void, having a bearing support surface, including a part-spherical surface portion, for receiving a self-aligning sleeve bearing;

a plurality of ribs extending axially within the body and dividing the void into a plurality of recesses, the radially inner surface of the ribs forming a part of the bearing support surface;

a plurality of plastically deformable teeth extending axially from the mouth; and a plurality of proud, co-planar abutment surfaces formed on the mouth and disposed respectively between adjacent teeth, wherein the teeth and abutment surfaces are adapted to co-operate with a complementarily shaped hole in the casing whereby deformation of the teeth secures the retainer axially, radially and rotationally to the casing.

20. A bearing retainer for fitting a bearing to a casing of a miniature motor, the retainer comprising a hollow body having:

an inner void;

a bearing support surface formed on the surface of the inner void;

a mouth formed in a face of the hollow body opening the inner void;

a plurality of plastically deformable teeth extending substantially perpendicular to the face and arranged around the mouth, the teeth being arranged to co-operate with at least one hole in the casing to prevent radial and rotational movement between the retainer and the casing and deformable to prevent axial separation of the retainer from the casing; and a plurality of abutment surfaces for axially aligning the retainer with the casing formed between adjacent teeth by depressions formed around roots of the teeth.

21. A bearing retainer according to claim 20, wherein the inner void has a tapering surface forming the bearing support surface.

22. A bearing retainer according to claim 20, wherein the inner void has at least three radially and axially extending ribs with radially inner faces forming the bearing surface and shaped to receive a spherical outer surface of a self-aligning sleeve bearing, the ribs creating a plurality of recesses within the inner void forming lubricant reservoirs.

23. A bearing retainer for fitting a bearing to a casing of a miniature motor, the retainer comprising:

a body structure having an inner void including a bearing support surface adapted to receive a self-aligning sleeve bearing;

a plurality of ribs extending along the surfaces of the inner void creating a plurality of recesses within the void, radially inner surfaces of the ribs forming a part of the bearing support surface;

an opening formed in a face of the body structure opening the inner void;

a plurality of plastically deformable teeth arranged circumferentially around the opening and extending substantially perpendicular to the face; and a plurality of coplanar abutment surfaces formed between adjacent teeth by depressions formed around the roots of the teeth, wherein the teeth and abutment surfaces are arranged to co-operate with a correspondingly shaped hole in the casing whereby deformation of the teeth secures the retainer axially, radially and rotationally to the casing.

* * * * *